March 15, 1960   F. T. BONNER ET AL   2,928,889
SEALED ELECTROLYTIC CELL WITH AUXILIARY ELECTRODE
Filed May 8, 1957
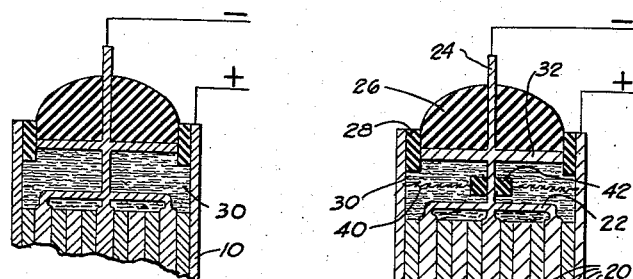
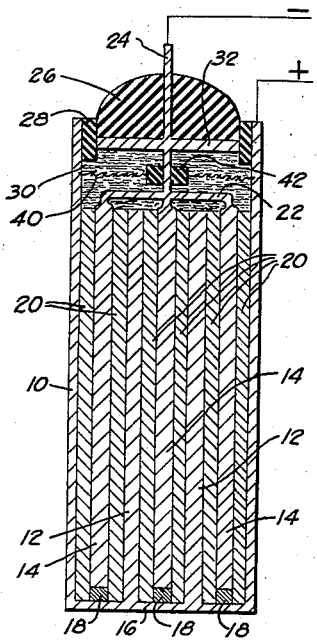
FIG.1
FIG.2
INVENTOR.
Francis T. Bonner
Henry B. Linford
BY
Frank N. Houghton
ATTORNEY United States Patent Office 2,928,889
Patented Mar. 15, 1960

2,928,889

SEALED ELECTROLYTIC CELL WITH AUXILIARY ELECTRODE

Francis T. Bonner, Winchester, Mass., and Henry B. Linford, Leonia, N.J., assignors, by mesne assignments, to Koehler Manufacturing Company, Marlboro, Mass., a corporation of Massachusetts Application May 8, 1957, Serial No. 657,904

3 Claims. (Cl. 136—24)

This invention relates to sealed nickel-cadmium galvanic cells as used in the construction of nickel-cadmium batteries, said cells containing free, unabsorbed electrolyte and being so constructed internally as to increase cycle life.

Sealed nickel-cadmium cells are now commonly made using thin separators between the plates and providing only enough electrolyte to saturate the separators without any excess electrolyte. In using such cells, if the charge conditions are appropriately controlled, hydrogen gas can be prevented from forming; although oxygen gas is necessarily formed, it does not accumulate in any significant amount since it combines with the spongy cadmium metal of the negative electrode. The thin separators are necessary to facilitate the absorption of the evolved oxygen, and the only electrolyte ordinarily present is that which is held by the thin separator material. Sealed cells usually have a rather restricted cycle life, one of the reasons being that the usual configurations do not permit the inclusion of electrolyte in addition to that held by the separators. The reason for this short life is not entirely clear; possibly when limited quantities of electrolyte are present, the gas bubbles formed push electrolyte out of the separator pores causing an unfavorable redistribution of the small quantity of electrolyte and consequently diminish the extent of ionic conducting path between electrodes. On the other hand, if too much electrolyte is present in conventional cells of this kind, the rate of oxygen absorption becomes slower than the rate of evolution, with the result that gaseous oxygen accumulates and the cell is consequently likely to swell or even to explode.

To improve the cycle life of sealed nickel-cadmium cells it would be advantageous to have an adequate quantity of free electrolyte available in the cell, but this has not hitherto been possible for reasons indicated above. It is accordingly the purpose of the present invention to provide a sealed nickel-cadmium cell which has a relatively longer effective life at full capacity than sealed nickel-cadmium cells hitherto available. Another object of the invention is to provide a sealed nickel-cadmium cell having an electrolyte reservoir in contact with the separators, and which is so arranged and constructed that danger of swelling or explosion is effectively eliminated. Other objects will appear from the following description.

Briefly stated, the objects of this invention are attained by providing a hermetically sealed nickel-cadmium cell with the usual positive and negative plates and having a reservoir contiguous to the plate ends and preferably above said plates, separators between said plates and completely filled with electrolyte, and an auxiliary negative electrode in physical contact with the electrolyte and in electrical contact with the negative electrodes, and substantially forming a part of the boundary of said reservoir (for example, defining the top of said reservoir, or positioned very close to said top so that no significant layer of gas can have room to build up between the auxiliary negative electrode and the reservoir wall). If desired a foraminous auxiliary positive electrode is positioned between the auxiliary negative electrode and the plates constituting the principal electrodes, said auxiliary positive electrode being insulated from said auxiliary negative electrode and in electrical contact with the positive electrodes. In line with customary procedure the sealing means of the cell, as well as the cell walls and joints, are made resistant to a certain degree of over-pressure, inasmuch as equilibrium between oxygen evolution in the cell and oxygen absorption by the negative electrodes is usually established at a pressure somewhat above atmospheric.

This invention will now be described in more detail in connection with the accompanying drawings, which are schematic and are to be considered as illustrative rather than limiting and in which Fig. 1 represents a schematic cross sectional view of a cell embodying one form of the present invention, and Fig. 2 shows a modified form of the structure shown in Fig. 1, wherein the foraminous auxiliary positive electrode is employed.

In the drawings, wherein like numerals refer to like parts, the numeral 10 represents a metal container which serves as the cell casing and also as the positive terminal. Within this container are positioned alternate positive plates or electrodes 12 and negative plates or electrodes 14 (which are together referred to hereinafter as the principal plates), the positive plates 12 being in electrical contact with base 16 of container 10 at their lower ends, as shown. The negative plates 14 are separated from base 16 by insulating members 18; the positive and negative plates are separated from each other by separators 20. Negative plates 14 are connected at their tops by lead 22 which is joined to negative terminal 24. The top of the cell is provided with a closure 26 of inert resin or other suitable inert material. This may be fixed in place to the top of container 10 by means of a plastic insulating material 28 which may be set in place in any suitable manner. Cover 26 is spaced away from the tops of plates 12, 14 and separators 20 so as to provide an electrolyte reservoir 30. At the top of this reservoir 30 is an auxiliary negative electrode 32, which is arranged in such fashion as to be in contact with or close to the bottom of cover 26 and also in contact with the electrolyte which fills reservoir 30. The auxiliary negative electrode 32 is also electrically connected in parallel with negative terminal 24, as shown.

In assembling the battery, the principal plates and the separators are first inserted, in the usual manner. The cell is filled with electrolyte which is permitted to permeate the separators and, after these are thoroughly saturated, is added in further quantity into the reservoir 30 so as to reach auxiliary negative electrode 32 which, with terminal 24, is attached to lead 22 at any appropriate step in the assembling procedure. Cover 26 is applied and sealed in place with insulating material 28, so as to leave substantially no gaseous fluid in reservoir 30.

The construction shown in Fig. 2 is the same as that in Fig. 1 except for the provision of a foraminous auxiliary positive electrode 40, which is located within reservoir 30 between auxiliary negative electrode 32 and the tops of the plates 12, 14 and separators 20, and out of contact with each. The foraminous positive electrode 40 may be supported by insulator 42 attached to negative terminal 24, and around its periphery is attached to container 10 and in electrical contact therewith. Any suitable arrangement for positioning and supporting electrode 40 may be employed, provided that it is insulated from the negative parts of the cell and is in contact with the positive parts, and as long as it extends adjacent the major portion of the lower surface of auxiliary negative electrode 32, and in spaced relation thereto. The purpose of the foraminous auxiliary positive electrode is to maintain electrochemical activity in the auxiliary negative electrode 32. It assures sufficient current density at the auxiliary negative electrode so that cadmium active material will oxidize and reduce during discharge and charge, respectively. The configuration of the foraminous positive electrode 40 is immaterial as long as it permits ready transfer of oxygen gas from the main body of the cell to the surface of the auxiliary negative electrode 32. It is not necessary that the foraminous positive electrode 40 have an electrochemical capacity equal to that of the auxiliary negative electrode 32; in fact, it will fulfill its function of maintaining electrochemical activity in the auxiliary negative electrode 32 even though its capacity is a small fraction of the capacity of electrode 32. As already indicated, auxiliary positive electrode 40 can be arranged in various ways with respect to the auxiliary negative electrode 32; another such way is to provide a thin layer of foraminous or porous insulating material between the two, in case they are closely spaced, so as to avoid electrical contact and yet permit free passage of liquid and gaseous fluid through such material.

In comparison with conventional cells of this type, the cell has an extended cycle life with steady operation and no added danger of swelling or explosion. The presence of free electrolyte assures an adequate amount in the separators. While most of the oxygen evolved during charging of the cell will ordinarily pass directly from the principal positive electrodes 12 to their neighboring principal negative electrodes 14, and be there absorbed by the cadmium, any oxygen bubbles which rise in the cell into the electrolyte reservoir have, in auxiliary negative electrode 32, an auxiliary cadmium-containing surface with which they can react and be converted out of their gaseous phase, thereby avoiding any build-up of gas within the cell. The presence of the auxiliary negative electrode 32 makes possible the absorption of oxygen by conversion from gaseous or dissolved to combined form at a sufficiently rapid rate to avoid any difficulty with swelling or explosion of the cell, and thus permits the inclusion of an excess of free electrolyte to promote extended cycle life of the cell.

While in the above the invention has been described with respect to a specific construction of a sealed nickel-cadmium cell, it may, of course, be applied to any of the known types of cells or batteries. Thus the plates, positive or negative, can be of the well-known sintered type, in which the nickel or cadmium active materials are introduced by the impregnation of a sintered nickel plaque, or they may be of the pocket type in which the active materials are contained in a perforated or slotted nickel container. Obviously, the type or location of sealing is not specific to this invention; many arrangements following the principles underlying the present invention will occur to those skilled in the art, as long as an auxiliary negative electrode is provided which is spaced from the edges of the principal plates 12, 14 to define a space between said edges and said auxiliary negative electrode, said space being filled with electrolyte, and the auxiliary negative electrode preferably being oriented at right angles to the planes of said principal plates and being electrically connected in parallel with them. Finally, it is preferred to have in said space containing said excess electrolyte a foraminous auxiliary positive electrode, substantially parallel to said auxiliary negative electrode and at right angles to said principal plates, and being electrically connected in parallel with the positive plates 12, for example by being connected to the container or housing 10.

The capacity and/or design of the auxiliary electrodes can be chosen within wide limits. The size and construction of the auxiliary negative electrode will depend upon the rate at which oxygen is released into the electrolyte reservoir from the principal positive plates, which in turn depends upon the design of the principal electrode assembly and may, of course, be in accord with any conventional or other design desired. Whether the auxiliary negative electrode will conform to the same or different design principles as the principal electrodes is a matter of choice, and if desired, for example, a pocket type auxiliary negative electrode may be used in a cell whose principal plates are of sintered construction. The same applies to the auxiliary positive electrode, which again may be of any desired construction and need not be the same as used for either the principal electrodes or the auxiliary negative electrode. The desired capacity and size of the auxiliary electrodes for a nickel-cadmium cell of any particular construction can be most readily determined by experiment.

We claim:

1. A hermetically sealed nickel-cadmium galvanic cell containing alternate positive and negative plates spaced apart and arranged parallel to each other, and separators filling the spaces between said plates, means defining a reservoir contiguous to the ends of said plates and separators, electrolyte completely filling said reservoir and saturating said separators, an auxiliary negative electrode in contact with the electrolyte in said reservoir, said auxiliary electrode being spaced apart from the positive plates in said cell and forming substantially a part of said reservoir-defining means, and being electrically directly connected in parallel with the negative plates therein, and being in contact with said electrolyte throughout its exposed surface area, a foraminous auxiliary positive electrode within said reservoir in electrical contact with the positive elements of said cell and insulated from the negative elements thereof and positioned between said auxiliary negative electrode and said plates and separators, said electrolyte filling the entire free space within said cell.

2. In a sealed nickel-cadmium galvanic cell having alternate positive and negative plates, and separators filling the spaces between said plates: means defining a reservoir in contact with edges of said plates and separators, electrolyte completely filling the free space within said reservoir and saturating said separators, an auxiliary negative cadmium electrode disposed substantially at right angles to the planes of said plates and separators and spaced apart therefrom, said auxiliary electrode being electrically directly connected in parallel with the negative plates of said cell, and being in contact with said electrolyte throughout its exposed surface area, and substantially forming a part of said reservoir-defining means, a foraminous auxiliary positive electrode in said reservoir, said electrode being disposed substantially parallel to said auxiliary negative electrode and insulated from the negative elements of said cell and in electrical contact with the positive elements thereof, said electrolyte filling the entire free space within said cell.

3. A hermetically sealed nickel-cadmium galvanic cell containing alternate positive and negative plates arranged parallel to each other, and separators filling the spaces between said plates, means defining a reservoir contiguous to the ends of said plates and separators, electrolyte completely filling said reservoir and saturating said separators, an auxiliary negative cadmium electrode in contact with the electrolyte in said reservoir, said auxiliary electrode being spaced apart from the positive plates in said cell and adjacent that part of said reservoir-defining means most remote from said plates, and being electrically directly connected in parallel with the negative plates therein, and being in contact with said electrolyte throughout its exposed surface area, and so arranged and positioned as to be contacted by the oxygen bubbles rising from said plates and separators, a foraminous auxiliary positive electrode within said reservoir in electrical contact with the positive plates of said cell and insulated from the negative elements thereof, and positioned between said auxiliary negative electrode and said plates and separators, said electrolyte filling the entire free space within said cell.

References Cited in the file of this patent

UNITED STATES PATENTS

| | | |
|---|---|---|
| 2,104,973 | Dassler | Jan. 11, 1938 |
| 2,571,927 | Neumann et al. | Oct. 16, 1951 |
| 2,614,138 | Jacquier | Oct. 14, 1952 |
| 2,646,455 | Jeannin | July 21, 1953 |
| 2,653,180 | Hignett et al. | Sept. 22, 1953 |
| 2,857,447 | Lindstrom | Oct. 21, 1958 |

FOREIGN PATENTS

| | | |
|---|---|---|
| 186,698 | Australia | Sept. 10, 1956 |